US012659168B2

(12) United States Patent
Sorniotti et al.

(10) Patent No.: US 12,659,168 B2
(45) Date of Patent: Jun. 16, 2026

(54) DYNAMICALLY VERIFYING AUTHENTICITY AND VALIDITY OF CREDENTIALS

(71) Applicant: International Business Machines Corporation, Armonk, NY (US)

(72) Inventors: Alessandro Sorniotti, Zurich (CH); Elli Androulaki, Zürich (CH); Ilie Circiumaru, Zurich (CH); Jens Jelitto, Rueschlikon (CH); Pasquale Convertini, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 18/384,755

(22) Filed: Oct. 27, 2023

(65) Prior Publication Data

US 2025/0141691 A1    May 1, 2025

(51) Int. Cl.
*H04L 9/32* (2006.01)
*G06F 21/31* (2013.01)
*G06F 21/45* (2013.01)

(52) U.S. Cl.
CPC ............ *H04L 9/3247* (2013.01); *G06F 21/31* (2013.01); *G06F 21/45* (2013.01)

(58) Field of Classification Search
CPC ......... H04L 9/3247; G06F 21/31; G06F 21/45
See application file for complete search history.

(56) References Cited

U.S. PATENT DOCUMENTS

| | | | |
|---|---|---|---|
| 10,756,906 B2 * | 8/2020 | Toth ...................... | H04L 9/0894 |
| 11,321,718 B1 * | 5/2022 | Narendranathan .......................... | G06Q 20/4016 |
| 11,432,149 B1 * | 8/2022 | Dhanoa ................... | G06F 21/36 |
| 11,636,776 B2 * | 4/2023 | Latorre ................. | G09B 19/00 707/827 |
| 2016/0142215 A1 * | 5/2016 | Kruegel ................ | H04L 9/3263 713/158 |
| 2019/0097812 A1 | 3/2019 | Toth | |

(Continued)

FOREIGN PATENT DOCUMENTS

| WO | WO-2023233173 A1 * | 12/2023 | ............. G06F 21/33 |
|---|---|---|---|
| WO | WO-2025181840 A1 * | 9/2025 | ............. H04L 9/321 |

OTHER PUBLICATIONS

Mukta et al, VCTP: A Verifiable Credential-based Trust Propagation for Personal Issues in Self-Sovereign Identity Platforms, 2023 IEEE International Conference on Decentralized Applications and Infrastructures, pp. 1-10 (Year: 2023).*

(Continued)

*Primary Examiner* — Christopher A Revak
(74) *Attorney, Agent, or Firm* — Aaron N. Pontikos

(57) ABSTRACT

A computer-implemented method, according to one embodiment, includes: receiving a request to verify authenticity of a credential that indicates that an associated holder has a set of certified attributes. In response to determining that the credential has not been compromised, current trustees that are associated with the credential are determined. Additionally, a determination is made as to whether the current trustees are trusted. In response to determining that one or more of the current trustees are not trusted, alternate trustees of the credential are determined. Moreover, these alternate trustees are used as updated current trustees to confirm authenticity of the credential.

20 Claims, 7 Drawing Sheets

(56) References Cited

U.S. PATENT DOCUMENTS

| | | | | |
|---|---|---|---|---|
| 2019/0303559 A1* | 10/2019 | Hamel | | G06F 21/64 |
| 2020/0067716 A1* | 2/2020 | Camenisch | | H04L 9/3268 |
| 2022/0272085 A1 | 8/2022 | Novotny et al. | | |
| 2023/0298015 A1* | 9/2023 | Kiraz | | H04L 9/0861 |
| 2023/0306412 A1* | 9/2023 | Gaur | | G06Q 20/1235 |
| 2024/0104521 A1* | 3/2024 | Azgad-Tromer | | |
| | | | | G06Q 20/4016 |

OTHER PUBLICATIONS

Schanzenbach et al., reclaimID: Secure, Self-Sovereign Identities using Name Systems and Attribute-Based Encryption, p. 1-12 ( Year: 2018).*
Bhattacharya et al., "Enhancing the Security and Privacy of Self-Sovereign Identities on Hyperledger Indy Blockchain," International Symposium on Networks, Computers and Communications (ISNCC), Oct. 2020, 9 pages.
Kubach et al., "A lightweight trust management infrastructure for self-sovereign identity," Open Identity Summit, 2021, pp. 155-165.
Dijk et al., "Technical exploration Ledger-based Self Sovereign Identity," SURF, May 2021, 55 pages.
Kubach et al., "Self-sovereign and Decentralized identity as the future of identity management?" Open Identity Summit, 2020, pp. 35-47.
Housley, R., "Cryptographic Message Syntax (CMS)," Vigil Security, Network Working Group RFC 5652, Sep. 2009, 56 pages, retrieved from https://www.rfc-editor.org/rfc/rfc5652.
Turner et al., "Multiple Signatures in Cryptographic Message Syntax (CMS)," Soaring Hawk, Internet Engineering Task Force (IETF) RFC 5752, Jan. 2010, 17 pages, retrieved from https://www.rfc-editor.org/rfc/rfc5752.
Nysed, "Obtaining Closed School Student Records, " New York State Education Department, 2023, 1 page, retrieved from https://www.acces.nysed.gov/bpss/obtaining-closed-school-student-records.
Smith, R., "Here's What Happens If Your College Closes or Loses Accreditation," College Reality Check, Jan. 16, 2022, 15 pages, retrieved from https://collegerealitycheck.com/college-closings-and-accreditation/.
Quigley, J., "The Future of Credentialing (Why Isn't Credential Fraud Zero?)," Accredible, Apr. 22, 2021, 6 pages, retrieved from https://www.accredible.com/blog/the-future-of-credentialing.
Barka et al., "A Role-Based Delegation Model and Some Extensions," Proceedings of the 23rd NISSC, Oct. 19, 2000, 10 pages, retrieved from https://csrc.nist.gov/csrc/media/publications/conference-paper/2000/10/19/proceedings-of-the-23rd-nissc-2000/documents/papers/021.pdf.
Barka et al., "Role-Based Delegation Model/ Hierarchical Roles (RBDM1)," 20th Annual Computer Security Applications Conference, Dec. 2004, 9 pages, retrieved from https://www.acsac.org/2004/papers/134.pdf.
Pornin et al., "Digital Signatures Do Not Guarantee Exclusive Ownership," Applied Cryptography and Network Security (ACNS), 2005, 13 pages, retrieved from https://www.bolet.org/~pornin/2005-acns-pornin+stern.pdf.
Menezes et al., "Security of Signature Schemes in a Multi-User Setting," Designs, Codes and Cryptography, vol. 33, 2004, pp. 261-274.

* cited by examiner

100

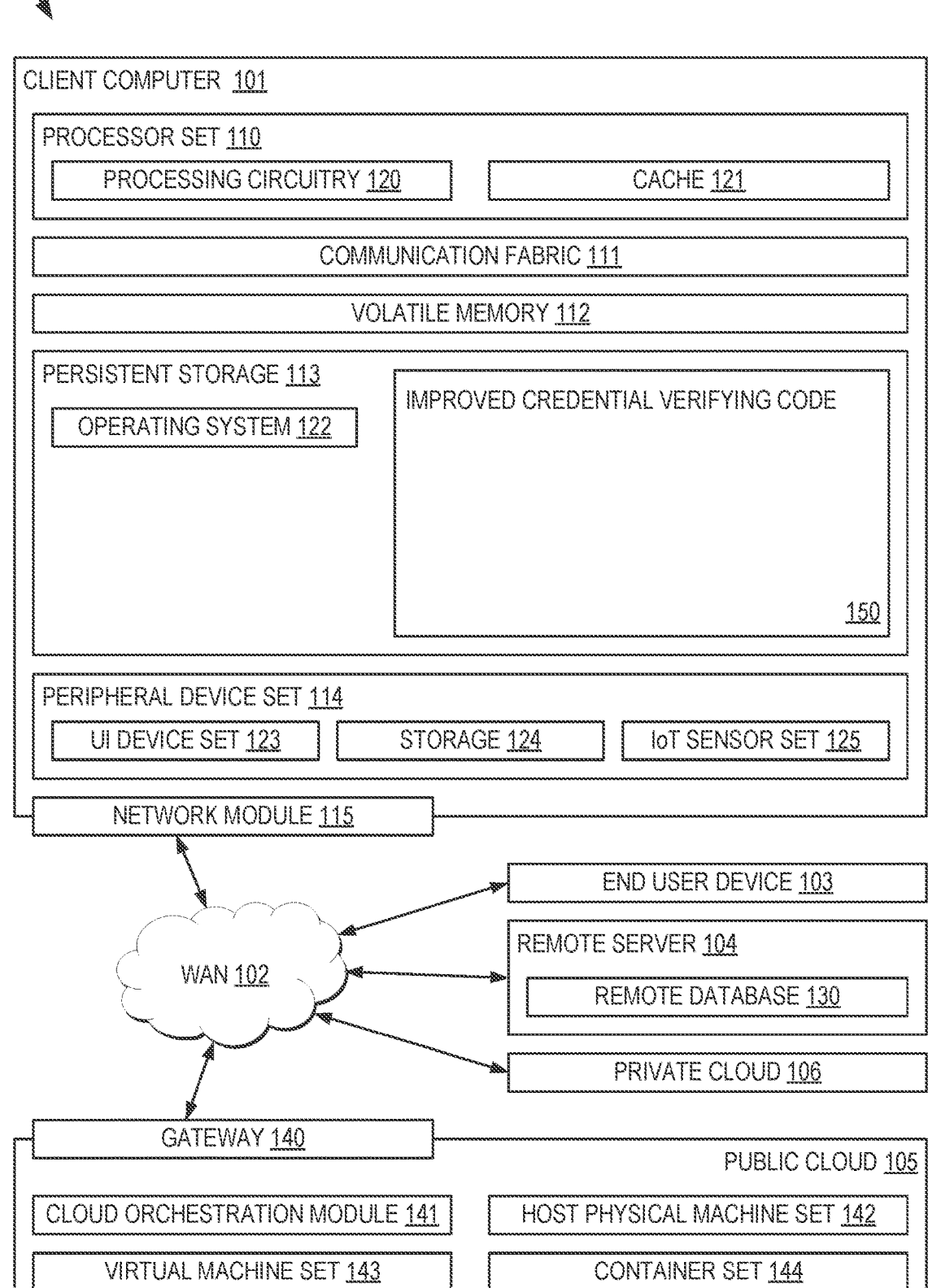

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED CREDENTIAL VERIFYING CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

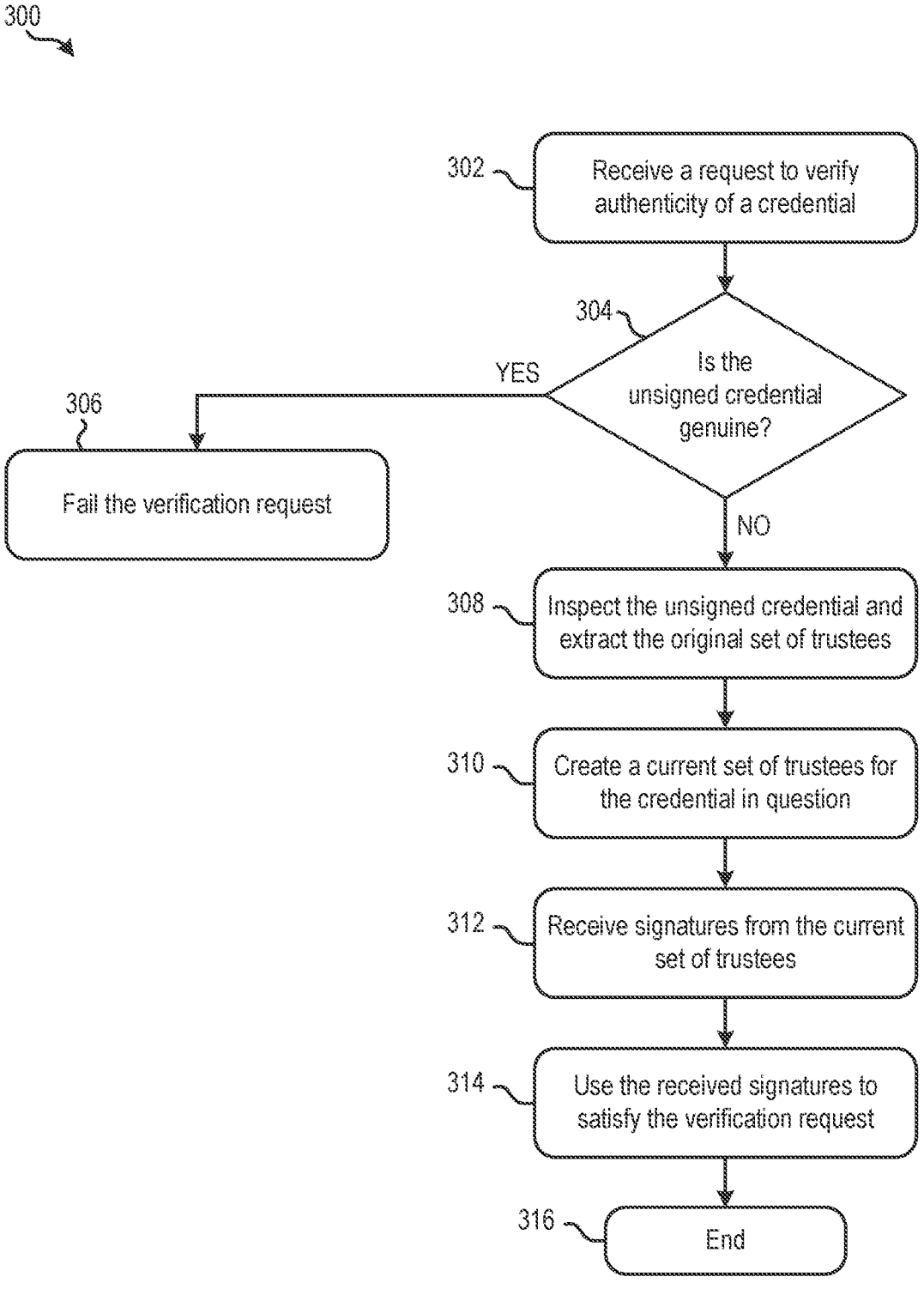

FIG. 3A

302 — Receive a request to verify authenticity of a credential

304 — Is the unsigned credential genuine?

YES

306 — Fail the verification request

NO

308 — Inspect the unsigned credential and extract the original set of trustees

310 — Create a current set of trustees for the credential in question

312 — Receive signatures from the current set of trustees

314 — Use the received signatures to satisfy the verification request

316 — End

308
&
310

370

372   Receive a request for a credential that indicates the associated holder has a specific set of certified attributes 374   Create an unsigned credential that includes the set of certified attributes 376   Sending one or more instructions to issue the unsigned credential 378   Assign a time stamp to the credential 380   Issue the credential to a source of the received request

DYNAMICALLY VERIFYING AUTHENTICITY AND VALIDITY OF CREDENTIALS

BACKGROUND

The present invention relates to verifying credentials, and more specifically, this invention relates to dynamically verifying authenticity of credentials at a point that the credentials are used (e.g., referenced), rather than statically inferring authenticity from originally issued credentials themselves.

Electronic documents (or digital files) have a number of benefits compared to physical documents. For instance, electronic documents are easier to store and access in comparison to physical documents. Electronic documents, especially in the form of verifiable credentials, can be electronically verified to ensure they have not been altered, to determine whether they have been signed by an authorized party, to inspect whether they have expired, to determine whether the documents have been revoked, etc. Also, depending on the format of an electronic document, certain portions of the electronic document may be adjusted to maximize privacy. In contrast, the process of accessing a physical document involves manually searching each document in a collection until the desired document is found, while multiple electronic documents can be automatically compared against one or more keywords.

Moreover, electronic documents can be uploaded from and/or downloaded to any device connected to a network, while tangible documents (e.g., papers) must be physically transported between locations. Similarly, electronic documents take up much less space than their physical counterparts. As a result, an increasing amount of physical material has been digitized.

While electronic (e.g., digital) documents are easier to store and access than their physical counterparts, the process of verifying authenticity of electronic documents has been impacted. This is particularly true in situations where an entity (e.g., educational entity) that issued a credential becomes unavailable over time. For example, an educational entity that issues a diploma credential may cease to exist in the future, and therefore may be unavailable to verify authenticity of the diploma.

SUMMARY

A computer-implemented method, according to one embodiment, includes: receiving a request to verify authenticity of a credential that indicates that an associated holder has a set of certified attributes. In response to determining that the credential has not been compromised, current trustees that are associated with the credential are determined. Additionally, a determination is made as to whether the current trustees are trusted. In response to determining that one or more of the current trustees are not trusted, alternate trustees of the credential are determined. Moreover, these alternate trustees are used as updated current trustees to confirm authenticity of the credential.

A computer program product, according to another embodiment, includes a computer readable storage medium having program instructions embodied therewith. Moreover, the program instructions are readable by a processor, executable by the processor, or readable and executable by the processor, to cause the processor to: perform the foregoing method.

A system, according to yet another embodiment, includes: a processor as well as logic that is integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

FIG. 3A is a flowchart of a method, in accordance with one approach.

DETAILED DESCRIPTION

Figure 2:
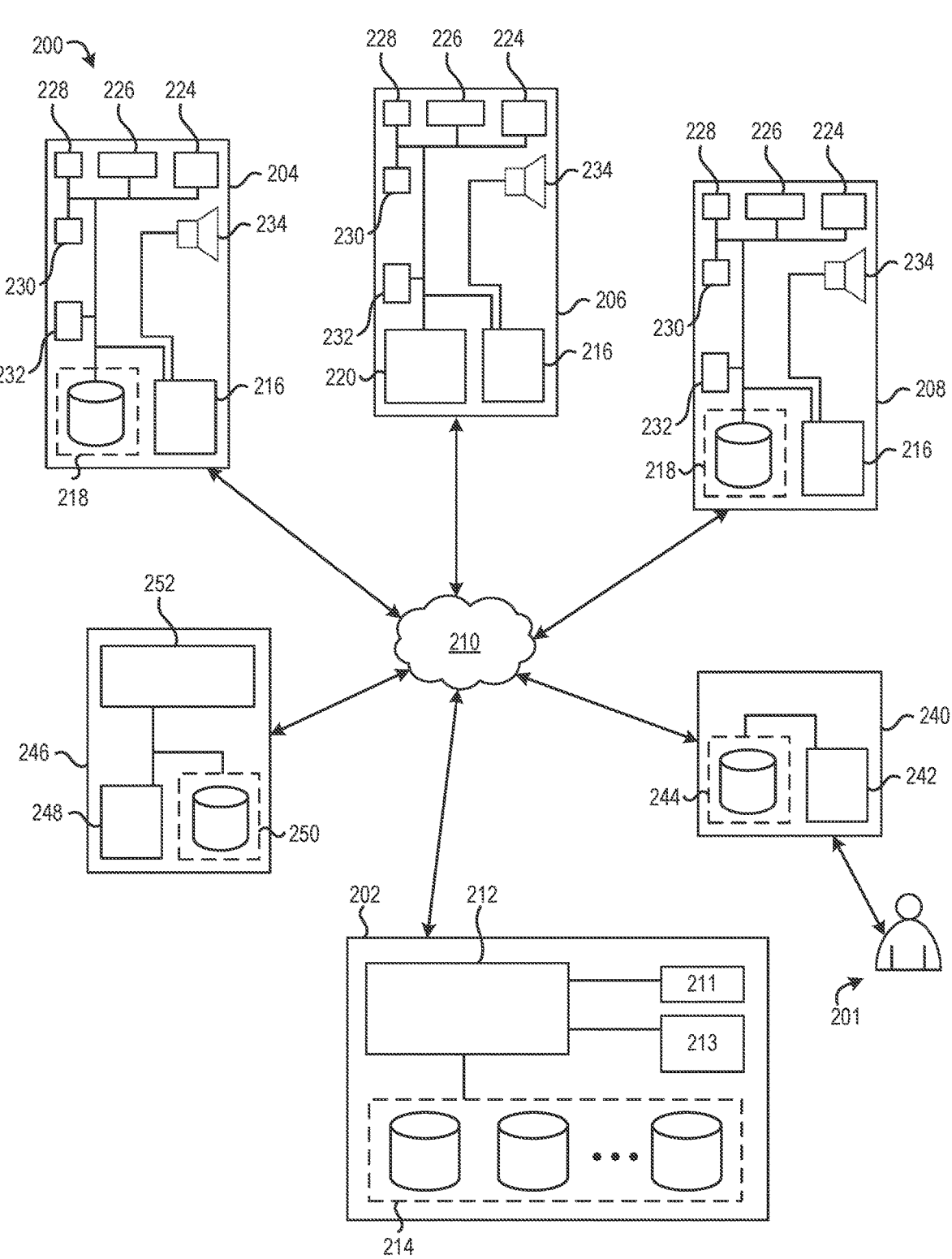
FIG. 2 is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products dynamically verify authenticity of credentials. Implementations herein are able to verify authenticity of credentials at a point that the credentials are used (e.g., referenced), rather than statically inferring authenticity from the originally issued credentials themselves. This significantly improves the efficiency of the process involved with verifying previously issued credentials, e.g., as will be described in further detail below.

In one general embodiment, a computer-implemented method includes: receiving a request to verify authenticity of a credential that indicates that an associated holder has a set of certified attributes. In response to determining that the credential has not been compromised, current trustees that are associated with the credential are determined. Additionally, a determination is made as to whether the current trustees are trusted. In response to determining that one or more of the current trustees are not trusted, alternate trustees of the credential are determined. Moreover, these alternate trustees are used as updated current trustees to confirm authenticity of the credential.

In another general embodiment, a computer program product includes a computer readable storage medium having program instructions embodied therewith. Moreover, the program instructions are readable by a processor, executable by the processor, or readable and executable by the processor, to cause the processor to: perform the foregoing method.

In still another general embodiment, a system includes: a processor as well as logic that is integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approaches ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved credential verifying code at block 150 for dynamically verify authenticity of credentials at a point that the credentials are used (e.g., referenced), rather than statically inferring authenticity from the originally issued credentials themselves. This significantly improves the efficiency of the process involved with verifying previously issued credentials, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is expected to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, electronic documents (or digital files) have a number of benefits compared to physical documents. For instance, electronic documents are easier to store and access in comparison to physical documents. Electronic documents, especially in the form of verifiable credentials, can be electronically verified to ensure they have not been altered, to determine whether they have been signed by an authorized party, to inspect whether they have expired, to determine whether the documents have been revoked, etc. Also, depending on the format of an electronic document, certain portions of the electronic document may be adjusted to maximize privacy.

In contrast, the process of accessing a physical document involves manually searching each document in a collection until the desired document is found, while multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts. As a result, an increasing amount of physical material has been digitized.

While electronic (e.g., digital) documents are easier to store and access than their physical counterparts, the process of verifying authenticity of electronic documents has been impacted. This is particularly true in situations where an entity (e.g., educational entity) that issued a credential becomes unavailable over time. For example, an educational entity that issues a diploma credential may cease to exist in the future, and therefore may be unavailable to verify authenticity of the diploma, thereby resulting in the diploma credential being untrusted and effectively useless. Conventional systems have thereby suffered from significant attrition over time.

In sharp contrast to these conventional shortcomings, implementations herein dynamically verify authenticity of credentials at a point that the credentials are applied (e.g., used), as opposed to statically inferring authenticity from the originally issued credentials themselves. This desirably allows for issued credentials to remain relevant and useable over time while also reducing the risk of credential tampering. For instance, some implementations verify the credibility (e.g., security level) of trustees that originally issued the credential and/or that are responsible for maintaining the credential. This allows for different levels of verification (e.g., security) to be applied while evaluating the credibility of credentials, e.g., as will be described in further detail below.

Looking now to FIG. 2, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the system 200 includes a backend system 202 that is connected to electronic devices 204, 206, 208. Each of these electronic devices 204, 206, 208 may correspond to trustees that are able to access (e.g., communicate with) the respective electronic devices 204, 206, 208. Accordingly, the electronic devices 204, 206, 208 and/or trustees may be separated from each other such that they are positioned in different geographical locations. For instance, the backend system 202 and electronic devices 204, 206, 208 are connected to a network 210. Credential holder 201 and electronic device 240 are shown as being connected to network 210, along with verifier 246. Electronic devices 204, 206, 208 (e.g., trustees) provide evidence that supports the issuance and accuracy of a credential. This "evidence" is provided by electrically signing the credential, thereby indicating that the credential has been inspected and deemed satisfactory. Verification of this issued credential may further be performed by a party that receives the credential, e.g., see verifier 246. This verification may be performed by inspecting details of the credential and verifying the signatures that were previously provided by the issuers, e.g., as will be described in further detail below.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc., may be sent between the electronic devices 204, 206, 208, 240, regardless of the amount of separation which exists therebetween, e.g., despite being positioned at different geographical locations.

However, it should also be noted that two or more of the electronic devices 204, 206, 208, 240, and/or backend system 202 may be connected differently depending on the approach. According to an example, which is in no way intended to limit the invention, two edge compute nodes may be located relatively close to each other and connected by a wired connection, e.g., a cable, a fiber-optic link, a wire, etc.; etc., or any other type of connection which would be apparent to one skilled in the art after reading the present description.

While each of the electronic devices 204, 206, 208, 240, and backend system 202 are shown as being connected to a same network 210, it should be noted that information may be sent between the locations of system 200 differently depending on the implementation. According to an example, which is in no way intended to limit the invention, a shared (e.g., open) communication channel corresponding to a credential verification procedure may be formed between each of the electronic devices 204, 206, 208. This shared communication channel may be formed by the processor 212 and a channel management module in response to a scheduled meeting, receiving an impromptu request from an individual to certify a credential, a predetermined condition being met, etc. The shared communication channel thereby allows the trustees associated with each of the electronic devices 204, 206, 208, 240 to exchange information (e.g., notes, audio signals, typed messages, etc.) freely between each other.

According to an example, credential holder 201 has been issued a credential which indicates the holder 201 has a predetermined set of certified attributes. For instance, the credential may indicate that the holder 201 has satisfied all the requirements to earn an undergraduate degree from an accredited university. While applying for a new job, holder 201 submits their credential as proof that they meet the prerequisites for the job position. In response, processor 212 may coordinate with the verifier 246 to verify authenticity of the credential submitted by the holder 201. Specifically, verifier 246 may dynamically verify authenticity of the credential in response to the credential being received (e.g., applied) from a holder of the credential. Moreover, the backend system 202 may coordinate the resolution of the trustees and provisioning of the credential signatures by the respective trustees. As noted above, this is in sharp contrast to conventional systems which are limited to statically inferring authenticity of credential from the originally issued credentials themselves. Accordingly, implementations herein are able to more efficiently and securely verify the authenticity of a credential. For instance, processor 212 may be configured to perform any one or more of the operations in method 300 below.

Referring still to FIG. 2, the electronic devices 204, 206, 208 are shown as having a different configuration than the backend system 202. For example, in some implementations the backend system 202 may be a central server which includes a large (e.g., robust) processor 212 coupled to a cache 211, a machine learning module 213, and a data storage array 214 having a relatively high storage capacity.

The backend system 202 may also store at least some information about the different electronic devices 204, 206, 208, 240, trustees, and credential holders. For instance, one or more predetermined settings, trustee preferences, application preferences, performance metrics, etc., may be collected from the electronic devices 204, 206, 208, 240, credential holders, and/or trustees over time and stored in memory for future use. Additionally, at least some of the information that is collected from the trustees and/or credential holders may be hashed and randomized before being stored in memory in some approaches. For instance, some approaches include encrypting and storing preferential selections, credential information, signature details, geographical location information, passwords, etc.

This information can further be used to customize at least certain details of unsigned credentials (e.g., templates) that are used to form the credentials. For example, machine learning models may be trained using details of credentials issued in the past, the trustees that originally created those credentials, the holders the credentials were issued to, etc. The machine learning models may thereby be used to evaluate credentials that are received and determine whether they remain authentic, based at least in part on patterns identified by the machine learning model in the training data.

Looking now to the electronic devices 204, 206, 208, each are shown as including a processor 216 coupled to memory 218, 220. Moreover, electronic device 240 includes a processor 242 and memory 244, while verifier 246 similarly includes a processor 248, memory 250, and verification module 252. The verifier 246 may thereby inspect credentials received to determine whether they have been issued correctly and remain accurate. In situations where credentials are determined to have been correctly issued and still accurate, a verification may be provided which authenticates the credentials for application, e.g., as will be described in further detail below.

The memory implemented at each of the electronic devices 204, 206, 208 of electronic devices 204, 206, 208 may be used to store data corresponding to credentials that have been issued, as well as related information. It follows that different types of memory may be used. According to an example, which is in no way intended to limit the invention, electronic devices 204 and 208 may include hard disk drives as memory 218 while electronic device 206 includes a solid state memory module as memory 220.

The processor 216 is also connected to a display screen 224, a keyboard 226, a computer mouse 228, a microphone 230, and a camera 232. The processor 216 may thereby be configured to receive inputs from the keyboard 226 and computer mouse 228, e.g., based on inputs received from the respective trustees. However, it should be noted that the components included in electronic devices 204, 206, 208 and the configuration of those components is in no way intended to be limiting. For example, one or more of the electronic devices 204, 206, 208 may be a mobile device (e.g., smart phone, tablet, etc.) that may not include a physical computer mouse. Accordingly, computer mouse 228 may represent a "virtual mouse" that allows for a user (e.g., issuer) to move a pointer displayed by an operating system on a display screen of the respective electronic devices. For example, computer mouse 228 may include a touch screen module that receives signals corresponding to the signals received in response to a user physically touching a resistive, capacitive, etc. touch screen (e.g., see display screen 224). Similarly, keyboard 226 may be a physical computer keyboard in some approaches, while in other approaches the keyboard 226 may be a logical keyboard (e.g., displayed on a touch screen of the electronic device).

Inputs received from a computer mouse 228, keyboard 226 typically corresponds to information presented on the display screen 224 while the entries were received. Moreover, the inputs received from the keyboard 226 and computer mouse 228 may impact the information shown on display screen 224, data stored in memory 218, 220, information collected from the microphone 230 and/or camera 232, status of an operating system being implemented by processor 216, etc. Each of the electronic devices 204, 206, 208 are also shown as including a speaker 234 which may be used to project (e.g., generate) one or more audio signals.

It should also be noted that the display screen 224, the keyboard 226, the computer mouse 228, microphone 230, camera 232, and speaker 234 are each coupled directly to the processor 216 in the present implementation. Accordingly, inputs received from the keyboard 226 and/or computer mouse 228 may be evaluated before being implemented in the operating system and/or shown on display screen 224.

It should also be noted that while the electronic devices 204, 206, 208 are depicted as including similar components and/or design, each of these electronic devices 204, 206, 208 may include any desired components which may be implemented in any desired configuration. In some instances, each electronic device (e.g., mobile phone, laptop computer, desktop computer, etc.) connected to a network may be configured differently to provide each location with a different functionality.

According to an example, which is in no way intended to limit the invention, electronic device 204 may include a cryptographic module (not shown) that allows for encrypting and/or decrypting at least a portion of a credential, while electronic device 206 includes a data compression module (not shown) that allows data to be compressed before being sent over the network 210 and/or stored in memory, thereby improving performance of the system by reducing network strain and/or compute overhead at the electronic device itself. In another example, which again is in no way intended to limit the invention, electronic device 208 may include a machine learning module (not shown) configured to train and/or implement one or more machine learning models.

It follows that the different electronic devices in system 200 may have different performance capabilities. As noted above, the backend system 202 may have a higher storage capacity compared to the electronic devices 204, 206, 208. While this may allow the backend system 202 to store more data than the electronic devices 204, 206, 208, other factors impact performance. For example, traffic over network 210 may limit the amount of data that may be sent to the backend system 202 from the electronic devices 204, 206, 208. The workload experienced at each of the electronic devices 204, 206, 208 also impacts latency and limits the achievable performance at the respective locations and the system as a whole. These varying performance characteristics may also have a material impact on the efficiency by which a credential may be authenticated (e.g., verified).

Looking now to FIG. 3A, a flowchart of a computer-implemented method 300 for dynamically verifying credentials for authenticity, expiration, revocation, etc. at a point that the credentials are used (e.g., referenced), is illustrated in accordance with one approach. In other words, method 300 involves dynamically verifying authenticity of credentials, rather than statically inferring authenticity from the originally issued credentials themselves. Method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, one or more processors located at a backend system of a distributed system (e.g., see processor 212 of backend system 202 in FIG. 2 above) may be used to perform one or more of the operations in method 300.

Moreover, in various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 302 of method 300 includes receiving a request to verify authenticity of an unsigned credential. With respect to the present description, it should be noted that a "credential" may have different formats depending on the approach, but indicates that an associated holder possesses a credential with a predetermined set of certified attributes. In other words, a credential is able to indicate that a holder has satisfied a predetermined set of requirements to prove they have a specific set of certified attributes. Moreover, an "unsigned credential" in this context and as used herein includes the set of attributes to be certified (the message body), a set of trustees to certify the set of attributes, and an issuance policy that outlines how the unsigned credential may be used after it is signed.

The verification request is performed by a party designated as the "verifier." Moreover, as noted above, this verification process does not simply involve retrieving a signature (or "public key") of an original trustee that created the credential to verify the signature. Rather, the verifier requests a "trustee service" to retrieve current (e.g., valid) trustees at a given point in time, as well as the associated signature(s).

However, in some approaches, the verification request may be initiated directly by an individual that claims to have been issued the credential. For example, a credential holder may wish to verify the authenticity of their credentials before applying to a new job to streamline the application process. In other approaches, a request to verify authenticity of one or more credentials may be performed by an employer who wishes to verify the authenticity of credentials associated with applicants who have provided their resumes and other credentials in association with a job opening. In still other approaches, a credential holder as well as an entity to which the credentials were submitted may send a joint request, thereby reducing the number of inadvertent credential verifications that are performed. This may further improve the performance of the system by avoiding any unnecessary processing.

Proceeding to operation 304, a determination is made as to whether the credential referenced in the request is genuine. In other words, operation 304 includes determining whether the credential is genuine. This may be determined by identifying whether the credential includes expected details or has been altered in any way since being created. In some situations, a counterfeit unsigned credentials may be created by an unauthorized entity after authorized trustees become unavailable. For example, after legitimate trustees go out of business, unauthorized entities may create counterfeit unsigned credentials by claiming they have been authorized by the legitimate trustees. In still other situations, credentials may be altered in an attempt to change the attributes the credential is certifying the holder possesses. For example, an individual may attempt to increase the number of credentials they are certified as satisfying, e.g., in an attempt to apply for a job posting they are not actually qualified for. It follows that operation 304 includes determining whether the credential was created after legitimate trustees are no longer available.

This determination may be performed differently depending on the approach. For instance, in some approaches the credential may be inspected to determine whether any information has been appended to details that were originally used to form the credential. This inspection may involve comparing visual and/or textual information in the credential to determine whether any differences exist, indicating that the details originally issued have been modified.

In some approaches, a time stamp is assigned to each credential that is created (e.g., see 406 of FIG. 4 below). Accordingly, the time stamp may indicate when the credential was formed. The time stamp may thereby be compared against a database of formed credentials to determine whether a corresponding entry exists, corroborating that the credential has not been altered.

In response to determining that the credential has not been issued genuinely, method 300 proceeds from operation 304 to operation 306. There, operation 306 includes failing the verification request. In some approaches, a failure warning may be returned to a source of the request received in operation 302. The failure warning may outline the reason(s) the request was not processed to provide context. Moreover, the failure warning may include options that explain how the failure may be overcome. In other words, method 300 may outline how a failed credential verification request may be reissued and successfully processed. For example, additional (e.g., heightened) security steps may be implemented to ensure a credential is authentic. The number and/or type of additional security steps may further depend on the type of credential, details associated with potential credential holders (e.g., if they have already issued a number of failed verification attempts), where and/or how the credential is attempting to be applied, etc.

Returning to operation 304, method 300 proceeds to operation 308 in response to determining that the unsigned credential is genuine. There, operation 308 includes inspecting the unsigned credential and extracting the original set of trustees that created the unsigned credential. In other words, the original set of trustees that create an unsigned credential should be indicated on the unsigned credential itself, but could also be stored elsewhere. For instance, the original set of trustees that created an unsigned credential may be determined by accessing (e.g., referencing) a lookup table, a predetermined area in memory, etc.

In some approaches, the original set of trustees that formed the unsigned credential in question may be stored in a distributed and secure location, e.g., using blockchain. According to some approaches, the original set of trustees are extracted from a ledger, a database that stores different sets of original trustees as well as any associated events, etc. In some implementations, the evolution of trustees over time may also be stored and accessed to quickly determine how the trustees have changed over time and how they relate to the trustees that originally created the unsigned credentials, e.g., as would be appreciated by one skilled in the art after reading the present description.

In response to extracting the original set of trustees that created the unsigned credential, operation 310 includes creating a current set of trustees for the credential in question. In other words, operation 310 includes determining whether the original set of trustees still corresponds to authorizing the credential in question, and, if this is not the case, to determine the current set of trustees.

In some approaches, operation 310 includes determining whether the one or more current trustees meet a local verification policy, trust (or "security") threshold, etc. As noted above, use of the term "trustee" is in no way intended to be limiting, and may include any entity capable of issuing and/or verifying credentials. For example, a trustee may include one or more of an individual, an educational entity (e.g., college or university), a business, a trust, etc.

In response to creating (e.g., determining) the current set of trustees for the credential in question, a request is sent to each of the current trustees to provide signatures for the unsigned credential. Accordingly, operation 312 includes receiving signatures from the current set of trustees. Operation 314 includes the operation of the verifier using the received set of signatures to satisfy the verification request, e.g., as would be appreciated by one skilled in the art. From operation 314, the flowchart of FIG. 3A proceeds to operation 316, whereby method 300 may end. However, it should be noted that although method 300 may end upon reaching operation 316, any one or more of the processes included in method 300 may be repeated in order to verify other credentials. In other words, any one or more of the processes included in method 300 may be repeated to verify additional credentials for which verification requests have been received.

Figure 3B:
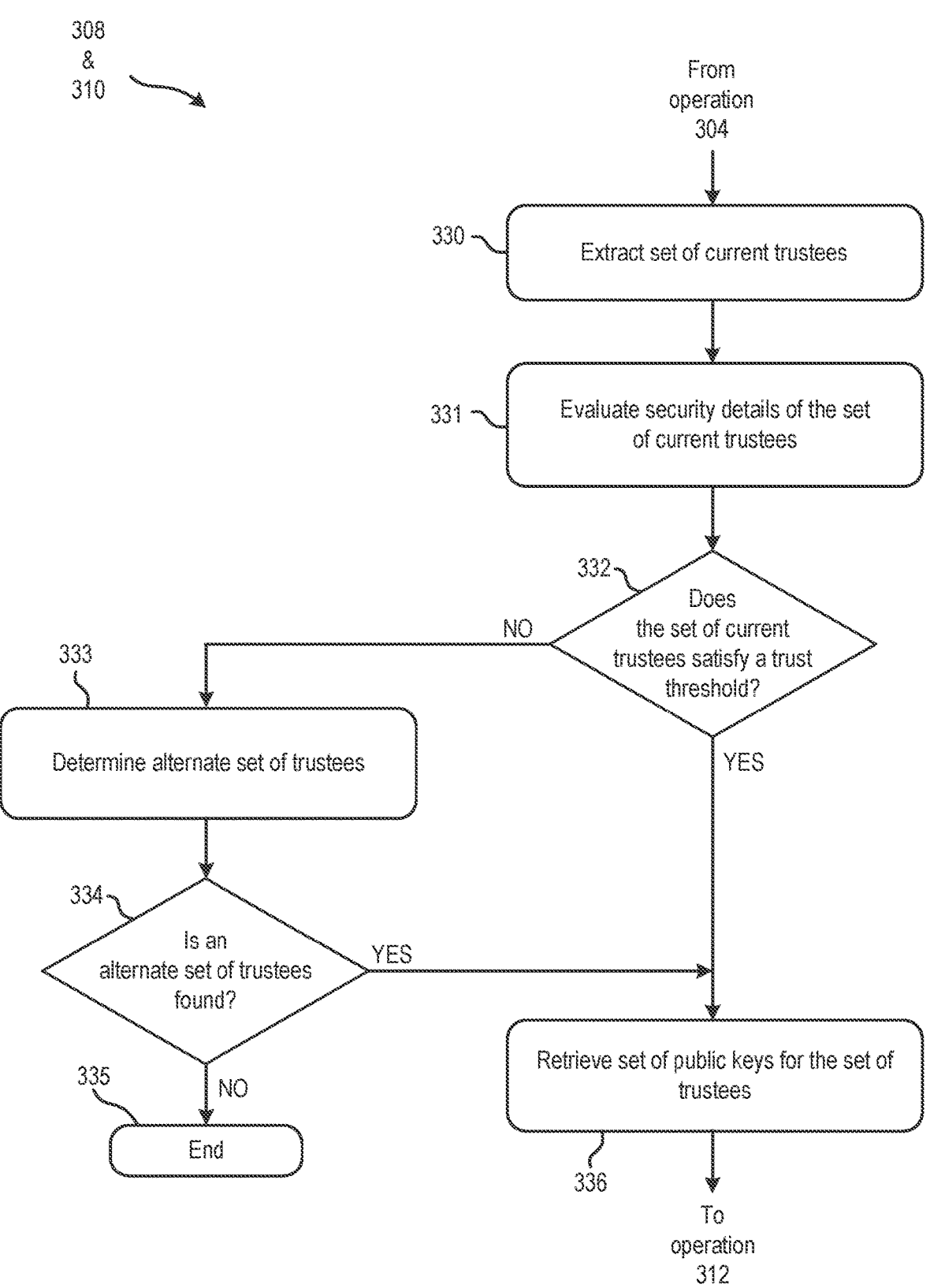
FIG. 3B is a flowchart of sub-operations for the operations in the method of FIG. 3A, in accordance with one approach.

Referring momentarily now to FIG. 3B, exemplary sub-operations of determining the set of current trustees for an unsigned credential are illustrated in accordance with one embodiment. One or more of the sub-operations in FIG. 3B may be used to perform operation 310 of FIG. 3A. However, it should be noted that the sub-operations of FIG. 3B are illustrated in accordance with one embodiment which is in no way intended to limit the invention.

As shown, sub-operation 330 of FIG. 3B includes extracting the current trustees starting from the original set of trustees that created the unsigned credential. This original set of trustees should be indicated unsigned credential, but also be stored in a lookup table in memory, etc. The current list of trustees may be extracted from information stored about the state and history of the original and current trustees on a ledger, a database, lookup table, etc. For instance, the progression from current trustees to alternate and/or additional trustees may be recorded (e.g., stored) in a key-value store of a Distributed Ledger Technology (DLT) implementation. Accordingly, trustees that are currently relevant (e.g., assigned the responsibility to verify) to a given credential may be stored in a publicly available location. This may be desirable to ensure that fraudulent trustees are not referenced while attempting to verify a credential, e.g., as would be appreciated by one skilled in the art after reading the present description.

In some approaches, sub-operation 330 includes determining whether the original trustees are still associated with the credential being evaluated. In other words, sub-operation 330 includes determining whether any of the original trustees that created the credential have been replaced as a result of going out of business. Information obtained as a result of sub-operations 330 may further be used to create the current set of trustees for the credential in question.

Sub-operation 331 includes evaluating the security details of the original trustees. In other words, sub-operation 331 includes evaluating security related information that corresponds to the original trustees to determine whether the original trustees are trustworthy. For instance, the security details (e.g., encryption practices, certificate renewals, data storage, etc.) may indicate whether the current set of trustees is acceptable to the party requesting the verification of the credential. Moreover, the level of security that is desired by the requesting party may depend on the type of credential being verified, e.g., as would be appreciated by one skilled in the art after reading the present description.

Proceeding now to sub-operation 332, a determination is made as to whether the current set of trustees satisfy a trust threshold. In other words, sub-operation 332 includes determining whether the trustees in the current set trustees are trusted according to local verification policies. For instance, the trust details of the current trustees may be evaluated. It follows that the determination made in sub-operation 332 may be based at least in part on the evaluation performed in sub-operation 331. It should also be noted that a "trust threshold" is also referred to herein as a "security threshold" in some approaches.

As indicated above, credentials may be applied in a number of different situations, each of which may be associated with a different level of trust. For instance, job applications that involve security clearances and/or background checks may apply a higher level of security than a job application that simply requests an undergraduate degree. Moreover, certain industries may apply a higher level of security than others. It follows that a holder of a credential may be prompted to satisfy additional (e.g., heightened) security steps to ensure the credential is authentic. The number and/or type of additional security steps may further depend on the type of credential, details associated with the credential holder (e.g., if they have already issued a number of failed verification attempts), where and/or how the credential is attempting to be applied, etc. In other words, the implementation may impact the trust threshold applied to the security details determined from the current set of trustees, e.g., as would be appreciated by one skilled in the art after reading the present description.

One or more machine learning models may be used to evaluate the security details of the current trustees and/or determine whether each of the current trustees associated with the credential in question satisfy a trust threshold. In other words, the sub-operations of FIG. 3B may be performed using one or more machine learning models. The machine learning models are thereby able to determine how closely each security detail associated with the current trustees match one or more trust thresholds.

In some approaches, the machine learning models may be trained using historical information associated with credentials that have been previously, created, issued, reissued, and/or denied. The historical information may be accumulated in repositories (e.g., memory) and used as training data to improve the process of evaluating credentials. In some approaches, the machine learning models may also be trained using performance based data that is acquired over time. Accordingly, the machine learning models may be able to more accurately evaluate credentials, credential holders, trustees, etc.

With continued reference to FIG. 3B, the flowchart is shown as proceeding to sub-operation 333 in response to determining that the current trustees do not satisfy a trust threshold. In other words, the flowchart proceeds to sub-operation 333 in response to determining the current set of trustees assigned to the credential in question are not sufficiently trustworthy that if they were to verify the credential, the verified credential would satisfy the given trust threshold. Accordingly, sub-operation 333 includes determining an alternate set of trustees to use to verify the credential in question. In other words, sub-operation 333 includes supplementing the current set (e.g., original set) of trustees with alternate trustees to achieve a set of "updated current trustees," as referred to herein.

With respect to the present description, trustees may no longer be trusted as a result of a number of different situations. For instance, in some approaches the one or more of the "original" trustees may no longer exist. As noted above, over time trustees may form and dissolve over time and therefore the trustees that are designated as being originally assigned to sign a credential may no longer be available to actually sign (e.g., reissue) the credential. In other approaches, details associated with the current trustees may change over time. For example, the current trustees may implement different security protocols, support additional functionality, follow different procedures, etc. It follows that while the current trustees may still be available to reissue a credential, the reissued credential may not meet desired security standards.

From sub-operation 334, the flowchart proceeds to sub-operation 336 in response to determining that an alternate set of trustees is available. There, operation 336 includes using the alternate trustees determined in sub-operation 334 as an updated version of the "current set" of trustees to satisfy the verification request. In other words, sub-operation 336 may include retrieving the public keys for the current set trustees. However, the "current set" of trustees may actually include the original trustees and/or alternate trustees, e.g., as described above. It follows that the current set of trustees are associated with the private keys that will be used to generate signatures in sub-operation 312, such that the signatures may be used to satisfy the received verification request.

Alternatively, the flowchart proceeds from sub-operation 334 to sub-operation 335 in response to determining that an alternative set of trustees is not identified. In response to reaching sub-operation 335, the flowchart may end. However, it should be noted that although the flowchart may end upon reaching sub-operation 335, one or more of the sub-operations may be repeated in order to determine a set of current trustees for additional unsigned credential.

Returning briefly to FIG. 3A, it follows that method 300 is able to dynamically verify authenticity of credentials at a point that the credentials are used (e.g., referenced), rather than statically inferring authenticity from the originally created credentials themselves. For instance, method 300 may use trained machine learning models to dynamically verify authenticity of credentials. Again, this significantly improves the efficiency of the process involved with verifying previously issued credentials, e.g., as described herein.

Figure 3C:
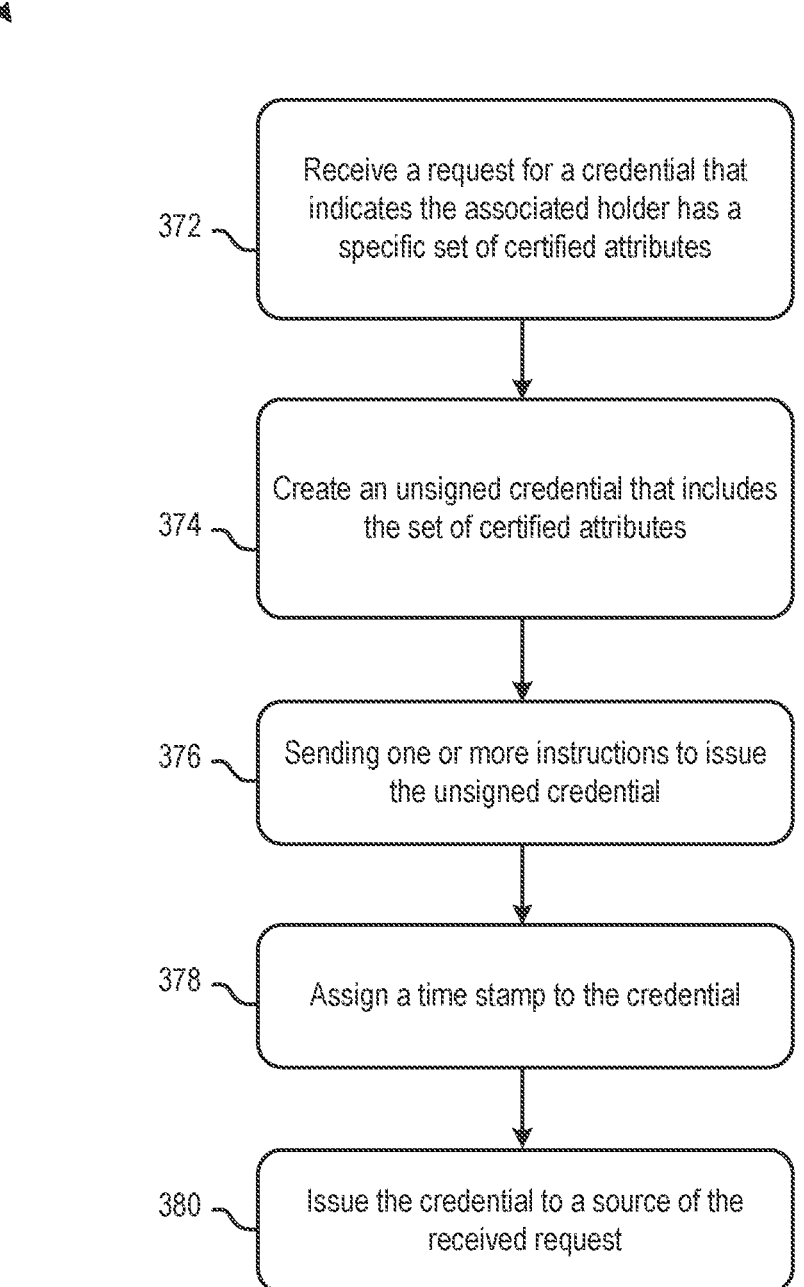
FIG. 3C is a flowchart of a method, in accordance with one approach.

Looking now to FIG. 3C, a flowchart of a computer-implemented method 370 for forming (e.g., issuing) a credential is illustrated in accordance with one approach. Method 370 may be performed in accordance with the present invention in any of the environments depicted in FIGS. 1-3A, among others, in various approaches. Of course, more or less operations than those specifically described in FIG. 3C may be included in method 370, as would be understood by one of skill in the art upon reading the present descriptions.

Each of the steps of the method 370 may be performed by any suitable component of the operating environment using known techniques and/or techniques that would become readily apparent to one skilled in the art upon reading the present disclosure. For example, one or more processors located at a backend system of a distributed system (e.g., see processor 212 and/or processors 216 in FIG. 2 above) may be used to perform one or more of the operations in method 370.

Moreover, in various approaches, the method 370 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 370. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 372 includes receiving a request for a credential that indicates the associated holder has a specific set of certified attributes. In some approaches, the request may be received by an issuer directly from an individual that claims to have the set of certified attributes. For example, a student graduating from a university may automatically trigger a request at the university (the issuer) for a credential indicating the student has met all the prerequisites associated with earning an undergraduate degree. It should also be noted that in some approaches, information associated with the graduating student may be received along with the request for the credential. The credential may thereby be created based on at least some of the information associated with the student.

Proceeding to operation 374, an unsigned credential that includes the set of certified attributes is created. It follows that any attributes that are included in the initial request and/or associated with the type of request received, may be compared against available unsigned credentials. A number of available unsigned credentials may be stored in a repository, where each credential captures a different set of attributes. With respect to the present description, an "unsigned credential" contains the set of attributes to be certified (the message body), a set of trustees, and an issuance policy.

Operation 376 includes sending one or more instructions to issue the unsigned credential. In other words, operation 376 includes the unsigned credential to a set of trustees designated to issue the credential. The credential that is issued may be specified in the unsigned credential, and steps may be provided to create a signed credential. This signing operation serves to prove that the assigned trustees have indeed issued the credential and to avoid unauthorized modification of the credential.

Operation 378 further includes assigning a time stamp to the signed credential. The time stamp may be assigned in response to receiving an indication that the credential was actually issued in response to the one or more instructions sent in operation 376. Moreover, the assigned time stamp may be stored in an immutable storage system, e.g., such as a DLT. As noted above, time stamps may be used in some approaches to indicate when the credential was signed (e.g., converted from an unsigned credential) and/or when the credential was issued by the trustees to a holder. Time stamps may thereby be used to evaluate credential validity when verification requests are received over time.

In addition to the time stamp, additional information may be added to a credential that is issued. For instance, supplemental details associated with a holder of the credential, the original trustees that issued the credential, etc., may be added to the credential that is issued to further improve efficiency of the verification process.

From operation 376, method 370 proceeds to operation 380. There, operation 380 includes issuing the credential to a source of the received request. In some approaches, the credential may be issued to a holder directly, e.g., over a network connection. Moreover, a copy of the issued credential may be stored in a repository as a backup.

Once again, it follows that implementations herein are able to dynamically verify authenticity of credentials at a point that the credentials are used (e.g., referenced), rather than statically inferring authenticity from the original credentials themselves. For instance, method 300 may use trained machine learning models to dynamically verify authenticity of credentials. Again, this significantly improves the efficiency of the process involved with verifying previously issued credentials, e.g., as described herein.

According to an in-use example, which is in no way intended to limit the invention, a group of trustees may often be requested to reissue credentials jointly. In these situations, the group of trustees may create a meta-entity with a decentralized identifier, and reissue credentials on behalf of this meta-entity. This may allow the trustees to share signing powers using threshold cryptography.

Figure 4:
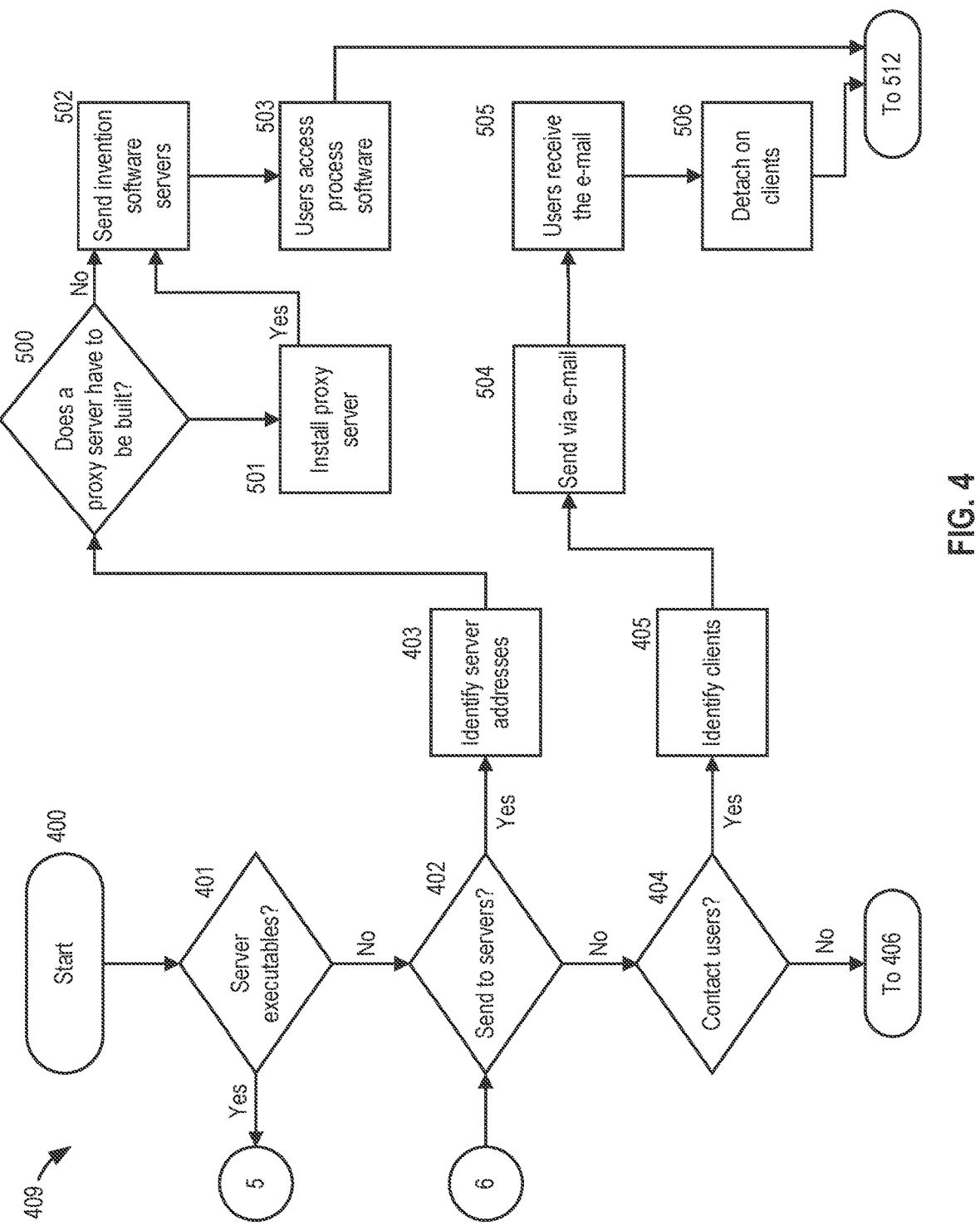
FIG. 4 is a flowchart of a method, in accordance with one approach.
Figure 4:
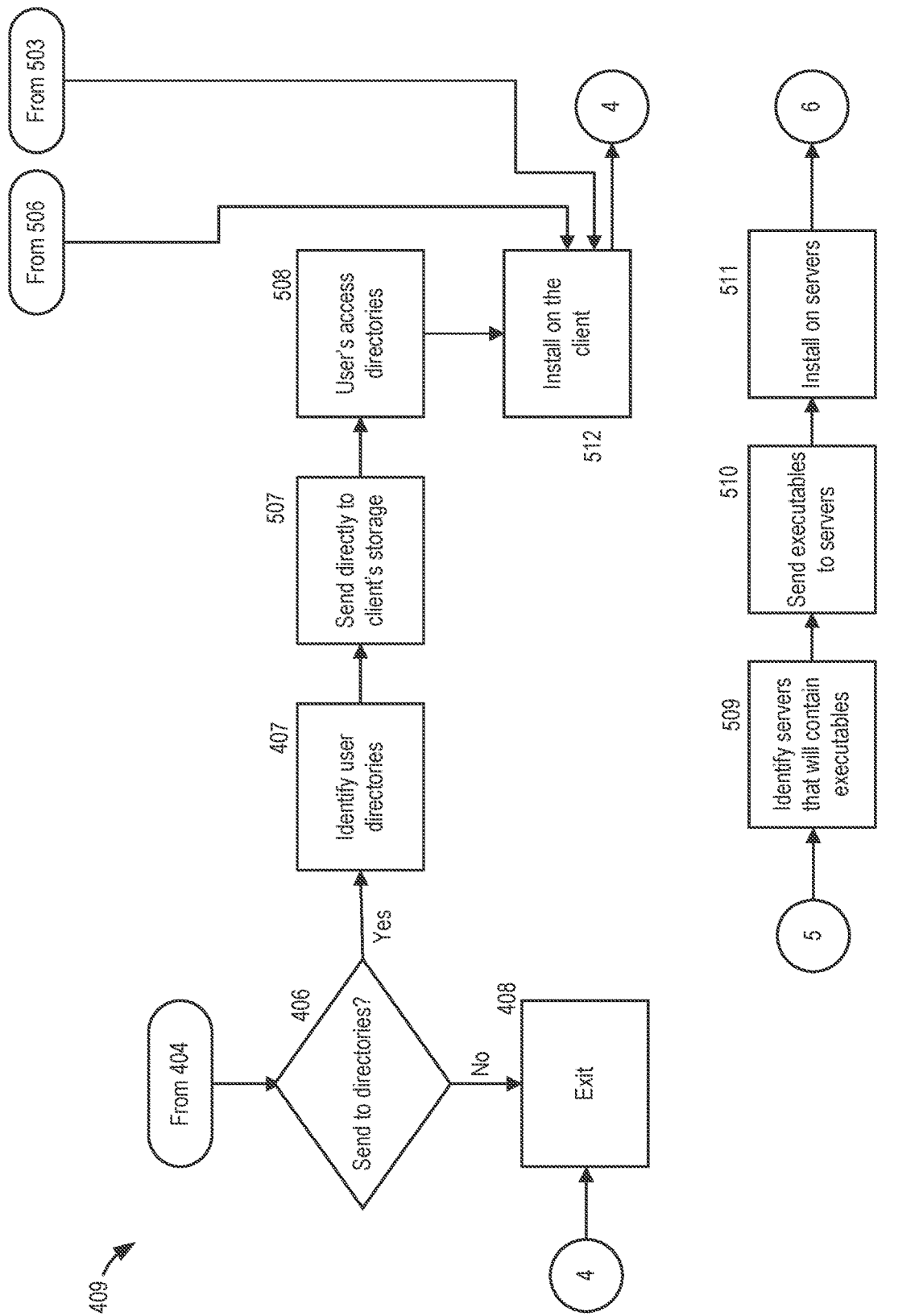

Now referring to FIG. 4, a flowchart of a method 409 is shown according to one approach. The method 409 may be performed in accordance with the present invention in any of the environments depicted in FIGS. 1-3B, among others, in various approaches. Of course, more or fewer operations than those specifically described in FIG. 4 may be included in method 409, as would be understood by one of skill in the art upon reading the present descriptions.

Each of the steps of the method 409 may be performed by any suitable component of the operating environment. For example, in various approaches, the method 409 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 409. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with dynamically verifying authenticity of credentials at a point that the credentials are used (e.g., referenced), rather than statically inferring authenticity from the credentials themselves. This significantly improves the efficiency of the process involved with verifying previously issued credentials, may be deployed by manually loading it directly in the client, server, and proxy computers via loading a storage medium such as a CD, DVD, etc., the process software may also be automatically or semi-automatically deployed into a computer system by sending the process software to a backend system, central server, or a group of backend systems and/or central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 409, step 400 begins the deployment of the process software. An initial step is to determine if there are any programs that will reside on a server or servers when the process software is executed (401). If this is the case, then the servers that will contain the executables are identified (509). The process software for the server or servers is transferred directly to the servers' storage via FTP or some other protocol or by copying though the use of a shared file system (510). The process software is then installed on the servers (511).

Next, a determination is made on whether the process software is to be deployed by having users access the process software on a server or servers (402). If the users are to access the process software on servers, then the server addresses that will store the process software are identified (403).

A determination is made if a proxy server is to be built (500) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is desired, then the proxy server is installed (501). The process software is sent to the (one or more) servers either via a protocol such as FTP, or it is copied directly from the source files to the server files via file sharing (502). Another approach involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (503). Another approach is to have the servers automatically copy the process software to each client and then run the installation program for the process software at each client computer. The user executes the program that installs the process software on the client computer (512) and then exits the process (408).

In step 404 a determination is made whether the process software is to be deployed by sending the process software to users via e-mail. The set of users where the process software will be deployed are identified together with the addresses of the user client computers (405). The process software is sent via e-mail (504) to each of the users' client computers. The users then receive the e-mail (505) and then detach the process software from the e-mail to a directory on their client computers (506). The user executes the program that installs the process software on the client computer (512) and then exits the process (408).

Lastly, a determination is made on whether the process software will be sent directly to user directories on their client computers (406). If so, the user directories are identified (407). The process software is transferred directly to the user's client computer directory (507). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (508). The user executes the program that installs the process software on the client computer (512) and then exits the process (408).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving a request to verify authenticity of an unsigned credential, the credential indicating that an associated holder has a set of certified attributes;

in response to determining that the credential has not been compromised, determining an original set of trustees that created the credential;

determining whether the original set of trustees are trusted by evaluating security details of the original set of trustees;

in response to determining that one or more of the original set of trustees are no longer trusted, determining alternate trustees of the credential for the one or more of the original set of trustees that are no longer trusted;

using the alternate trustees along with trusted ones of the original set of trustees to create an updated set of current trustees;

retrieving public keys for the updated set of current trustees; and using the public keys for the updated set of current trustees to confirm authenticity of the credential.

2. The computer-implemented method of claim 1, wherein the security details of the original set of trustees include encryption practices and/or certificate renewals associated with the original set of trustees.

3. The computer-implemented method of claim 2, comprising:

in response to determining that the current trustees are trusted, using the current trustees to confirm authenticity of the credential.

4. The computer-implemented method of claim 1, wherein using the alternate trustees along with trusted ones of the original set of trustees to create an updated set of current trustees to confirm authenticity of the credential includes:

identifying the alternate trustees;

obtaining signatures from the alternate trustees over the credential; and using the signatures to verify the authenticity of the credential and satisfy the request to verify authenticity.

5. The computer-implemented method of claim 1, wherein the credential is formed by:

receiving a request for the credential indicating that the associated holder has the set of certified attributes;

identifying an unsigned credential that includes the set of certified attributes;

converting the unsigned credential into the credential;

assigning a time stamp to the credential, the time stamp indicating when the credential was formed and/or when the credential was issued; and issuing the credential.

6. The computer-implemented method of claim 1, comprising:

in response to determining that the credential has been compromised, failing the request to verify authenticity.

7. A computer program product, comprising a computer readable storage medium having program instructions embodied therewith, the program instructions readable by a processor, executable by the processor, or readable and executable by the processor, to cause the processor to:

receive a request to verify authenticity of an unsigned credential, the credential indicating that an associated holder has a set of certified attributes;

in response to determining that the credential has not been compromised, determine an original set of trustees that created the credential;

determine whether the original set of trustees are trusted by evaluating security details of the original set of trustees; and in response to determining that one or more of the original set of trustees are not trusted:

determine alternate trustees of the credential for the one or more of the original set of trustees that are no longer trusted, and use the alternate trustees along with trusted ones of the original set of trustees to create an updated set of current trustees;

retrieve public keys for the updated set of current trustees; and use the public keys for the updated set of current trustees to confirm authenticity of the credential.

8. The computer program product of claim 7, wherein the security details of the original set of trustees include encryption practices and/or certificate renewals associated with the original set of trustees.

9. The computer program product of claim 8, wherein the program instructions are readable and/or executable by the processor to cause the processor to:

in response to determining that the current trustees are trusted, using the current trustees to confirm authenticity of the credential.

10. The computer program product of claim 7, wherein using the alternate trustees along with trusted ones of the original set of trustees to create an updated set of current trustees to confirm authenticity of the credential includes:

identifying the alternate trustees;

obtaining signatures over the credential from the alternate trustees; and using the signatures to verify the authenticity of the credential and satisfy the request to verify authenticity.

11. The computer program product of claim 7, wherein the credential is formed by:

receiving a request for the credential indicating that the associated holder has the set of certified attributes;

identifying an unsigned credential that includes the set of certified attributes;

converting the unsigned credential into the credential; and issuing the credential.

12. The computer program product of claim 11, wherein the program instructions are readable and/or executable by the processor to cause the processor to:

assign a time stamp to the credential, the time stamp indicating when the credential was formed and/or when the credential was issued.

13. The computer program product of claim 7, wherein the program instructions are readable and/or executable by the processor to cause the processor to:

in response to determining that the credential has been compromised, fail the request to verify authenticity.

14. A system, comprising:

a processor; and logic integrated with the processor, executable by the processor, or integrated with and executable by the processor, the logic being configured to:

receive a request to verify authenticity of an unsigned credential, the credential indicating that an associated holder has a set of certified attributes;

in response to determining that the credential has not been compromised, determine an original set of trustees that created the credential;

determine whether the original set of trustees are trusted by evaluating security details of the original set of trustees; and in response to determining that one or more of the original set of trustees are not trusted:

determine alternate trustees of the credential for the one or more of the original set of trustees that are no longer trusted, and use the alternate trustees along with trusted ones of the original set of trustees to create an updated set of current trustees;

retrieve public keys for the updated set of current trustees; and use the public keys for the updated set of current trustees to confirm authenticity of the credential.

15. The system of claim 14, wherein the security details of the original set of trustees include encryption practices and/or certificate renewals associated with the original set of trustees.

16. The system of claim 15, wherein the logic is configured to:

in response to determining that the current trustees are trusted, using the current trustees to confirm authenticity of the credential.

17. The system of claim 14, wherein using the alternate trustees along with trusted ones of the original set of trustees to create an updated set of current trustees to confirm authenticity of the credential includes:

identifying the alternate trustees;

obtaining signatures over the credential from the alternate trustees; and using the signatures to verify the authenticity of the credential and satisfy the request to verify authenticity.

18. The system of claim 15, wherein the logic is configured to:

assign a time stamp to the credential, the time stamp indicating when the credential was formed and/or when the credential was issued, wherein the credential is formed by:

receiving a request for the credential indicating that the associated holder has the set of certified attributes;

identifying an unsigned credential that includes the set of certified attributes;

converting the unsigned credential into the credential; and issuing the credential.

19. The system of claim 14, wherein the logic is configured to:

determine whether the credential is compromised by:

identifying a first time stamp corresponding to when the credential was created;

in response to determining that the original set of trustees are no longer trusted, identifying a second time stamp corresponding to when the original set of trustees became unavailable;

comparing the first and second time stamps; and in response to determining the second time stamp precedes the first time stamp, concluding that the credential is compromised.

20. The system of claim 14, wherein the logic is configured to:

determine whether the credential is compromised by:

identifying a first time stamp corresponding to when the credential was created, determining whether any information has been appended, after a first timestamp, to details that were originally used to create the credential at the first time stamp, and in response to determining that information has been appended, after the first time stamp, to the details that were originally used to create the credential, concluding that the credential is compromised; and in response to determining that the credential is compromised, failing the verification request.

* * * * *